(12) United States Patent
Nieman

(10) Patent No.: US 11,632,372 B2
(45) Date of Patent: Apr. 18, 2023

(54) PROVISIONING RESOURCES FOR ACCESS BY AN UNTRUSTED COMPUTER NETWORK

(71) Applicant: salesforce.com, inc., San Francisco, CA (US)

(72) Inventor: Nathan Nieman, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 385 days.

(21) Appl. No.: 16/894,499

(22) Filed: Jun. 5, 2020

(65) Prior Publication Data
US 2021/0385221 A1     Dec. 9, 2021

(51) Int. Cl.
*H04L 29/08*     (2006.01)
*H04L 9/40*      (2022.01)
*H04L 41/084*    (2022.01)

(52) U.S. Cl.
CPC .......... *H04L 63/10* (2013.01); *H04L 41/0846* (2013.01); *H04L 63/0227* (2013.01); *H04L 63/1441* (2013.01)

(58) Field of Classification Search
CPC ....................................................... H04L 63/10
See application file for complete search history.

(56) References Cited

U.S. PATENT DOCUMENTS 10,574,654 B1 *  2/2020  Schroeder ........... H04L 63/0209
2021/0409218 A1 * 12/2021  Elmenshawy .......... H04L 47/82

OTHER PUBLICATIONS

Cittadini, L. et al., "BeyondCorp Part III: The Access Proxy," Login, vol. 41, No. 4, Winter 2016, pp. 28-33.
Osborn, B. et al., "BeyondCorp: Design to Deployment at Google," Login, vol. 41, No. 1, Spring 2016, pp. 28-34.
Peck, J. et al., "Migrating to BeyondCorp: Maintaining Productivity while Improving Security," Login, vol. 42, No. 2, Summer 2017, pp. 49-55.
Ward, R. et al., "BeyondCorp: A New Approach to Enterprise Security," Login, vol. 39, No. 6, Dec. 2014, pp. 6-11.

* cited by examiner

*Primary Examiner* — Adnan M Mirza
(74) *Attorney, Agent, or Firm* — Fenwick & West LLP

(57) ABSTRACT

A system securely provisions a resource for access by computing systems of an untrusted network. The provisioning is performed securely such that at no stage during the process the computing systems of the untrusted network have direct access to the computing systems of the trusted network. The system creates a temporary network connected to the trusted network and provisions the requested resource in the temporary network. The system connects the temporary network to the trusted network for provisioning of the resource. The system disconnects the trusted network from the temporary network before connecting the untrusted network to the temporary network for providing access to the resource.

20 Claims, 9 Drawing Sheets

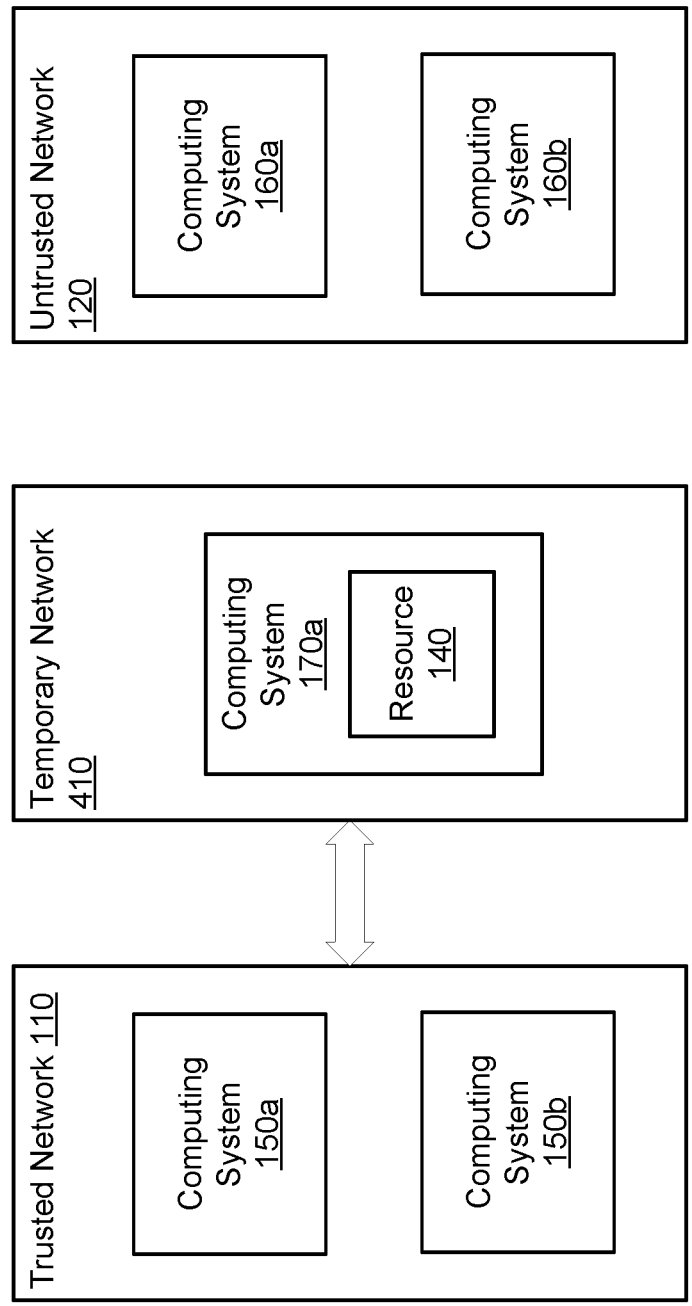

though at no stage is there direct connectivity between the computing systems of the trusted network and the computing systems of the untrusted network.

PROVISIONING RESOURCES FOR ACCESS BY AN UNTRUSTED COMPUTER NETWORK

BACKGROUND

Field of Art

This disclosure relates in general to security in computer networks, and in particular to provisioning of resources of a trusted network to computing devices of an untrusted network.

Description of the Related Art

Enterprises typically use a network of computers to support interaction between computing resources. Enterprises implement network security mechanisms that prevent unauthorized access or misuse of resources accessible within the network. A malicious user may try to access resources of the network. Once a malicious user has access to a particular network resource, the malicious user can access other resources via the particular network resource. Enterprises implement mechanisms to prevent such unauthorized access of computing resources of the enterprise.

Conventional techniques include network security solutions to prevent a malicious user from moving within the network assuming the user has managed to access one resource. These include zero trust networks that have complex solutions including multiple components to ensure that only appropriately authenticated devices are authorized to access the resource being provisioned. These solutions are complex and difficult to implement and maintain. Existing solutions for provisioning resources to untrusted networks either provide unauthorized access to resources other than the one being provisioned or are complex solutions that are difficult to implement and maintain.

BRIEF DESCRIPTION OF DRAWINGS

FIG. 4B illustrates the temporary network connected with the trusted network according to an embodiment.

Figure 1:
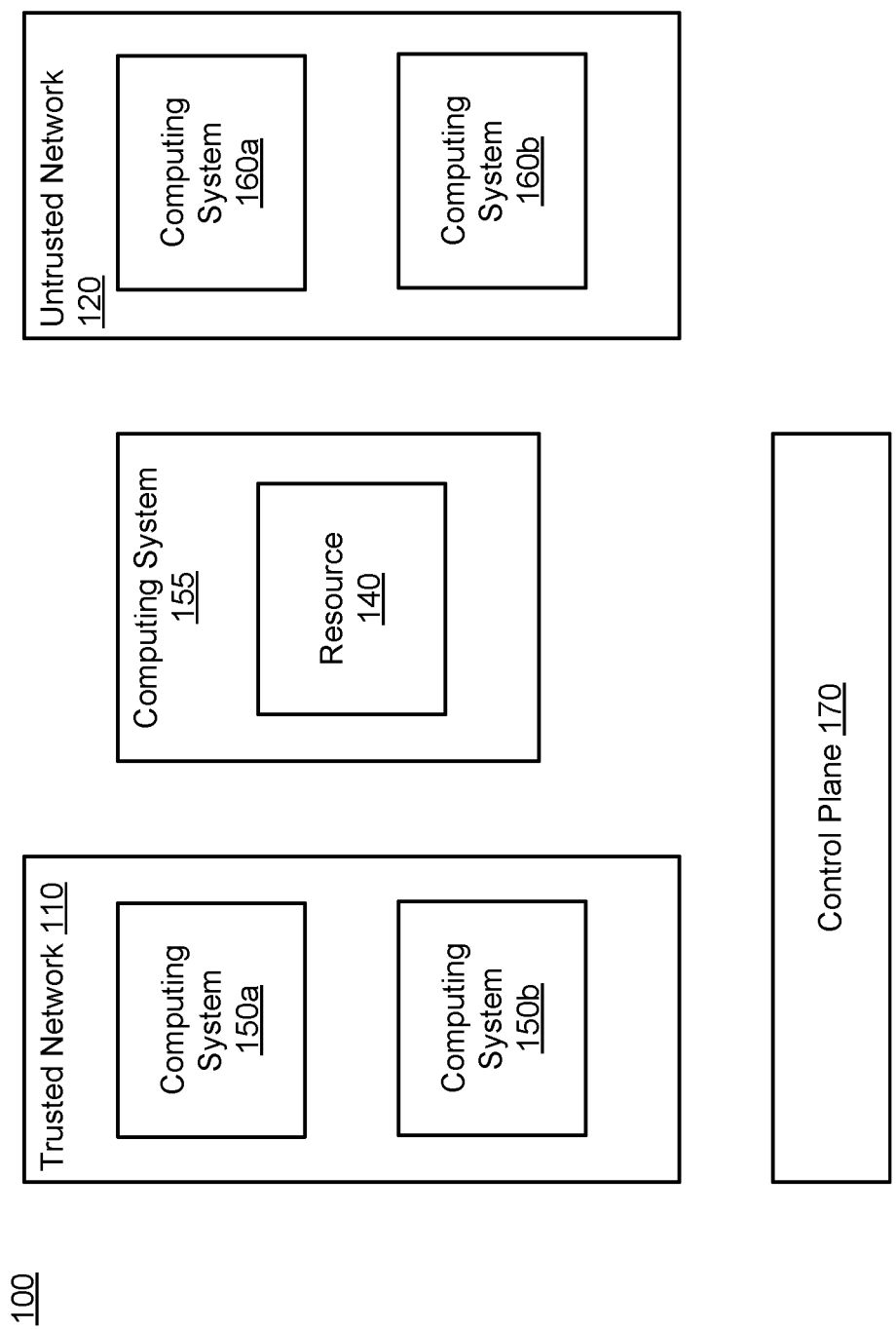
FIG. 1 is a block diagram of a system environment for provisioning of resources of a trusted network to an untrusted network according to one embodiment.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

An enterprise uses a trusted network that requires proper authentication for access to computing systems or resources of the enterprise. There may be computing systems outside the trusted network, for example, computing systems of an untrusted network. The trusted network is configured such that there is no routability between the untrusted network and the trusted network. The computing systems of the untrusted network may be provided temporary access or limited access to specific resources by the enterprise. The untrusted network may include malicious computing systems that try to gain unauthorized access to resources of the trusted network.

Conventional techniques for provisioning resources provide connectivity between computing systems of the untrusted network and computing systems of the trusted network. This connectivity maybe provided for a limited time. However, once connectivity is established, a malicious user of a computing system of the untrusted network may be able to access the resources of the trusted network. Conventional techniques use complex access control mechanisms to prevent computing systems of the untrusted network from accessing computing systems of the trusted network.

Embodiments securely provision a resource for access by computing systems of an untrusted network without requiring complex access control mechanisms. The provisioning is performed securely such that at no stage during the provisioning process, the computing systems of the untrusted network have direct access to the computing systems of the trusted network.

A resource provisioning system (also referred to as the system herein) receives a request to provision a resource of the trusted network for access by computing systems of the untrusted network. The resource may be a hardware resource such as a storage system or computing resource or a software resource such as an application.

The system creates a temporary network connected to the trusted network. The system provisions the requested resource in the temporary network using computing systems of the temporary network. Provisioning of the resource typically requires interactions between computing systems of the trusted network and computing systems of the temporary network. For example, computing systems of the trusted network may send configuration information for the resource to the computing systems of the temporary network or send instructions for configuring the resource.

Responsive to provisioning the requested resource in the temporary network, the system disconnects the trusted network from the temporary network. Subsequent to disconnecting the trusted network from the temporary network, the system connects the temporary network to the untrusted network and provides access to the resource to computing systems in the untrusted network. At no stage in the process is there connectivity between the computing systems of the untrusted network and computing systems of the trusted network. Therefore, embodiments provision the resource securely using the computing systems of the trusted network without letting the computing systems of the untrusted network connect with the computing systems of the trusted network.

In an embodiment, the system determines that the access to the resource provided to the untrusted network can be removed, for example, if the resource was made available to the untrusted network for a limited time. If the system determines that the access to the resource provided to the untrusted network can be removed, the system destroys the temporary network.

Overall System Environment

FIG. 1 is a block diagram of a system environment for provisioning of resources of a trusted network to an untrusted network according to one embodiment. The system environment 100 includes a trusted network 110, an untrusted network 120, a control plane, and a computing system 155 with a resource 140. Other embodiments may include more of fewer components or components different from those indicated herein. Functionality indicated as performed by a particular system or component may be performed by a different system or component than the one indicated herein.

A network refers to a connection of computers, servers and electronic devices that enables the devices to communicate with each other. The trusted network 110 refers to a network of computers that is accessible to authorized users, for example, users of an organization such as an enterprise. A trusted network 110 typically requires users to be authenticated, for example, via a login process so that only authenticated users are able to access the trusted network 110. The trusted network 110 may use encryption so that secure data cannot be intercepted and transmitted to unauthorized users. A trusted network 110 may use firewall, i.e., is a software program or piece of hardware that helps screen for security. The trusted network 110 may use software like virtual private network (VPN), which allows for remote devices to connect with secure data transmission. The trusted network 110 is typically under the control of the network manager or the network administrator associated with the enterprise.

The untrusted network 120 is a network that is outside the control of the network administrator of the enterprise. The users of the computing systems 160 of the untrusted networks are not properly authenticated to access data or services within the trusted network 110. The computing systems 160 of the untrusted network 120 may be managed by the owners of the computing system or any administrator that is not within the control of the enterprise. The untrusted network 120 may include computing systems that are malicious, i.e., computing systems that may attempt to access data that they are not authorized to access. Computing systems 160 of the untrusted network 120 are at a risk of attacks by computing system outside the untrusted network 120 or within the untrusted network 120.

In some embodiments, the trusted network 110 is configured such that computing systems of the untrusted network 120 are prevented from communicating with computing systems of the trusted network 110. Accordingly, the trusted network 110 is configured such that there is no routability between the untrusted network 120 and the trusted network 110. Accordingly, no computing system of the untrusted network can connect to a computing system of the trusted network. In an embodiment, the trusted network is configured such that there is a firewall that prevents network traffic between the untrusted network and the trusted networks.

The control plane 170 refers to the hardware/software of the networking architecture that configures the network topology. In an embodiment, the control plane 170 may be part of a router architecture. The control plane 170 includes software and hardware that can perform various functions including (1) configuring new networks so that a set of computers are able to interact with each other using the network, (2) connecting two networks by allowing computing systems of one network to interact with computing systems of another network, (3) disconnecting two networks that are connected so that the computing systems of network to interact with computing systems of the two networks are unable to interact with each other, (4) destroying the network so that computing systems of the network are no longer able to use the network and computing systems of other networks that were connected to the network do not have access to the computing systems or resources of the destroyed network.

A resource 140 represents hardware (e.g., central processing unit or CPU, storage, and network) or software (e.g., database server management systems, load balancers, web services, applications) that provides certain functionality. For example, a resource may allow storage of data or provide computational functionality, for example, via certain applications. The resource 140 may be a service, for example, a web service that can be accessed by computing systems. In an embodiment, the resource 140 is a public cloud resource, i.e., a resource that is made available by the enterprise to public via network, for example, the internet. The trusted network 110 provisions the resource 140, i.e., makes the resource 140 available. The trusted network 110 may make the resource 140 available to computing systems outside the trusted network 110, for example, computing systems of the untrusted network 120.

The networks presented in the system environment 100 use networking hardware that provides communication pathways between various computing systems. The networking hardware includes routers, switches, and so on as well as wired links such as cable or optics or wireless links such as Wi-Fi based on radio technology. The network uses a networking protocol such as the transmission control protocol/Internet protocol (TCP/IP), the User Datagram Protocol (UDP), the hypertext transport protocol (HTTP), etc. The data exchanged over the network 110 can be represented using technologies and/or formats including the hypertext markup language (HTML), the extensible markup language (XML), etc.

A computing system may be a server, a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 105 can be any device having computer functionality, such as a personal digital assistant (PDA), mobile telephone, smartphone, wearable device, etc.

The figures use like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral.

System Architecture

Figure 2:
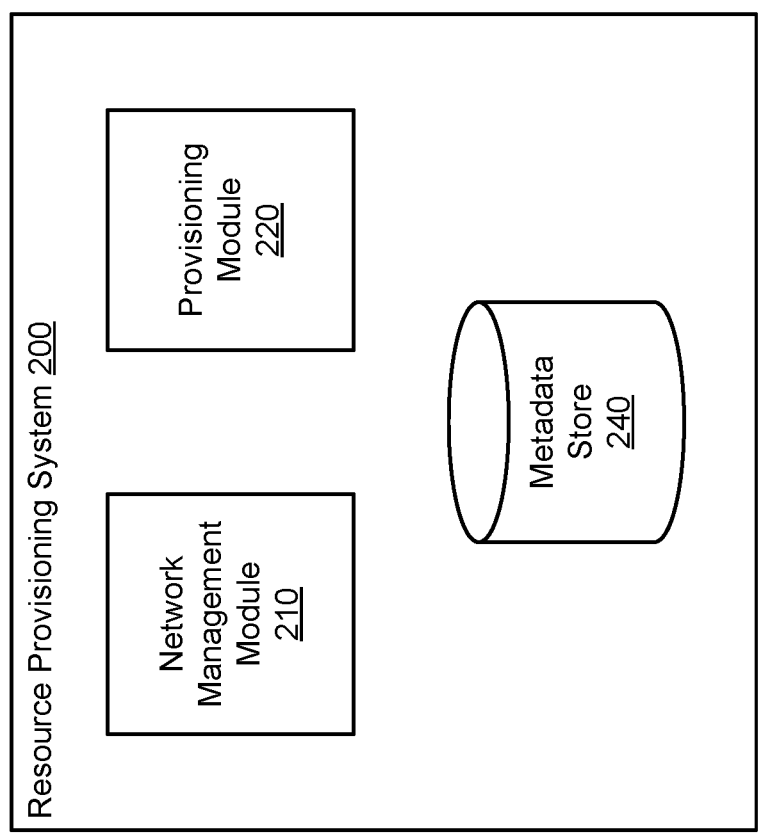
FIG. 2 is a block diagram illustrating components of a resource provisioning system for provisioning of resources of a trusted network to an untrusted network according to one embodiment.

FIG. 2 is a block diagram illustrating components of a resource provisioning system for provisioning of resources of a trusted network to an untrusted network according to one embodiment. The resource provisioning system 200 comprises a network management module 210, a provisioning module 220, and a metadata store 240. Other embodiments can have different and/or other components than the ones described here, and that the functionalities can be distributed among the components in a different manner. Accordingly, a function that is indicated as being performed by a component may be performed by other components than the one indicated herein.

The various components shown in FIG. 2 may exist on different computing systems. For example, the network management module 210 may run on one computing system and the provisioning module 220 may run on another computing system. The components of the resource provisioning system 200 may run on the computing systems of the trusted network or may run on a computing system that is outside the trusted network, for example, a computing system or any other hardware associated with the control plane 170. The resource provisioning system 200 may not run any component on a computing system of the untrusted network 120.

The network management module 210 performs various network related operations, for example, creating a new network, connecting a network to another network, disconnecting a network from another network, and destroying a network. The network management module 210 may be implemented using components of a control plane 170. The network management module 210 creates a network by configuring the network such that a set of computing systems are able to interact with each other via the network. The network management module 210 destroys a network by reconfiguring the network such that the set of computing systems are not able to connect to each other via the network.

The provisioning module 220 provisions resources of the trusted network 110. In an embodiment, the provisioning module 220 runs on a computing system within the trusted network 110 and provisions public cloud resources for access by computing systems outside the trusted network, for example, computing systems of the untrusted network 120. The provisioning module 220 executes the processes described herein, for example, the process illustrated in the flowchart shown in FIG. 3.

Overall Process

Figure 3:
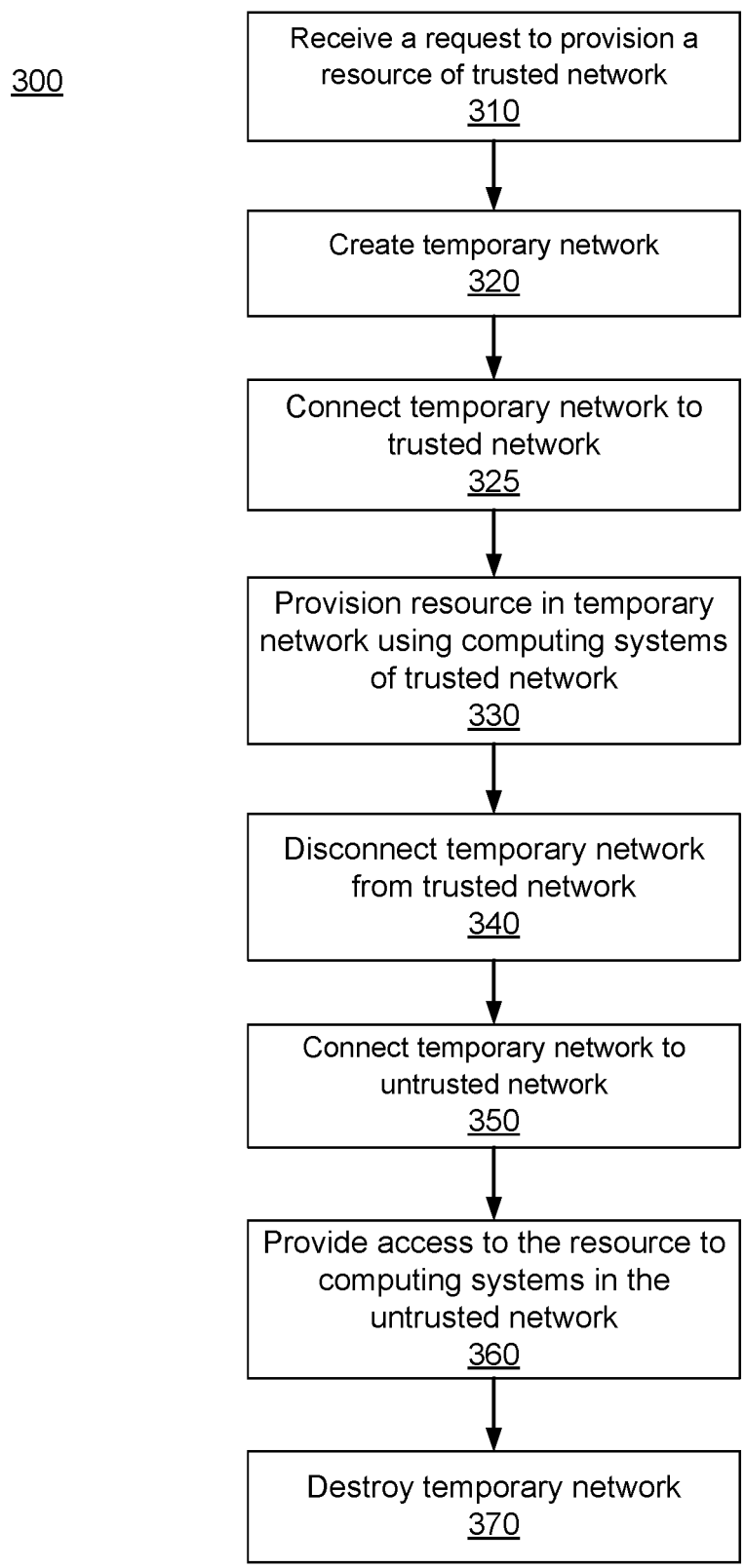
FIG. 3 is a flow chart illustrating the process for provisioning of resources of a trusted network to an untrusted network according to one embodiment.

FIG. 3 is a flow chart illustrating the process for provisioning of resources of a trusted network to an untrusted network according to one embodiment. Other embodiments may perform steps of FIG. 4 in different orders. Moreover, other embodiments can include different and/or additional steps than the ones described herein. The steps of the flowchart of FIG. 3 are illustrated in connection with FIGS. 4A-E. FIGS. 4A-E illustrate using examples, various steps of the process for provisioning of resources of a trusted network to an untrusted network according to an embodiment.

The resource provisioning system 200 receives 310 a request to provision a resource of the trusted network 110. The received request to provision the resource specifies the resource of the trusted network and requests to make the resource available for access by computing systems 160 of the untrusted network 120.

The resource provisioning system 200 creates 320 a temporary network 410. A temporary network is a network that is created for a specific purpose or for a set of specific tasks that need the network for a limited time. The temporary network may be destroyed after the tasks are performed or the purpose is served. The temporary network may be repurposed for other tasks. Destroying a network reconfigures the set of computing systems that were connected by the network in a manner that they cannot connect to each other or otherwise interact with each other using the network. The computing resources may continue to function independently or interact with each other or other computing resources using another network. In some embodiments, the after destroying a temporary network, the temporary network and the resources within the temporary network no longer exist. For example, the resource provisioning system 200 may destroy the temporary network using the control plane 170 and de-provision the resources of the temporary network such that the resources no longer exist.

A temporary network is also referred to as an airlock network, since it acts similar to an airlock mechanism for ensuring that access to the resource being provisioned is securely transferred from the trusted network to the untrusted network without allowing routability between the untrusted network and the trusted network at any time.

Figure 4A:
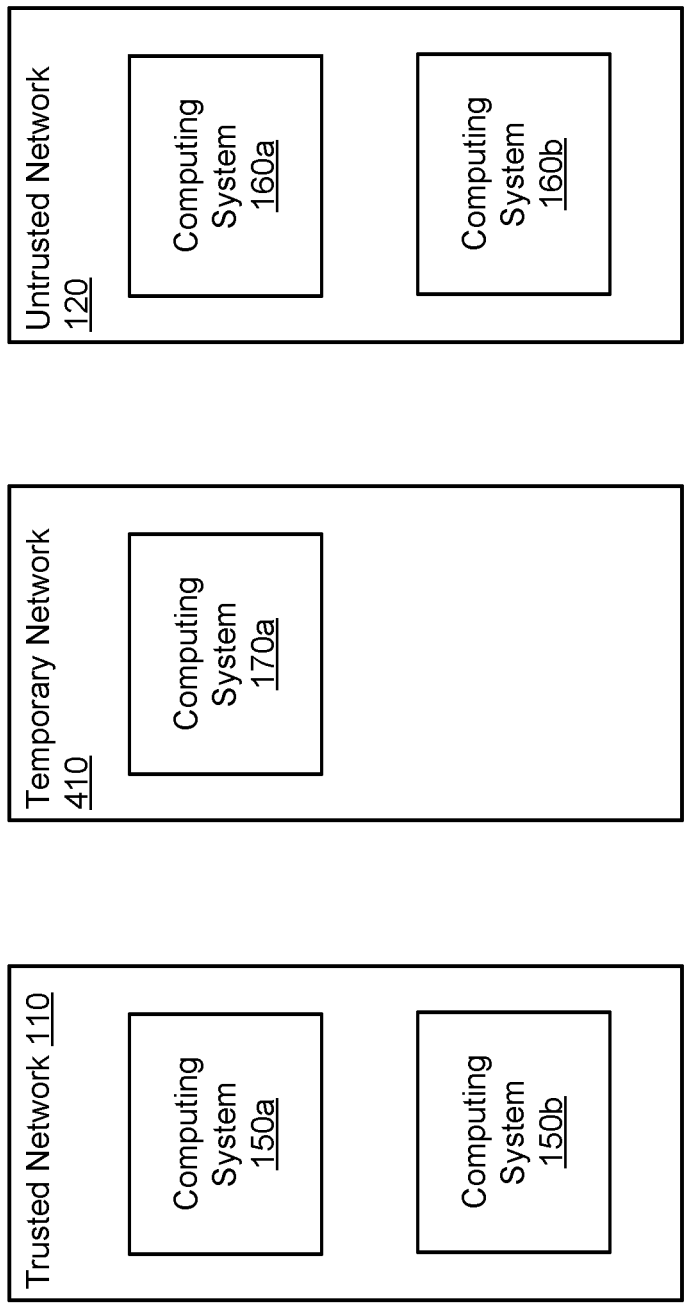
FIG. 4A illustrates a temporary network created with one or more computing systems 170 according to an embodiment.

FIG. 4A illustrates the temporary network 410 created with one or more computing systems 170 according to an embodiment. As shown in FIG. 4A, at this stage none of the trusted network 110 or the untrusted network 120 are connected to the temporary network 410. Accordingly, neither computing systems 150 of the trusted network 110 can communicate with computing system 170 of the temporary network 410, nor can the computing systems 160 of the untrusted network 120 communicate with computing system 170 of the temporary network 410.

The resource provisioning system 200 connects 325 the temporary network 410 to the trusted network 110. Accordingly, the computing systems of the 150 of the trusted network 110 are able to interact with computing systems of the temporary network 410. However, the computing systems 160 of the untrusted network 120 are not allowed to connect with computing systems of the temporary network. FIG. 4B illustrates the temporary network 410 connected with the trusted network 110 according to an embodiment.

The computing systems 150 of the trusted network provision the requested resource 140 in the temporary network 410. The resource 140 may be provisioned on a computing system 170 of the temporary network 410. The provisioning of the requested resource 140 requires interaction between the computing systems 150 of the trusted network 110 and the computing systems 170 of the temporary network. Since at this stage the temporary network is connected to the trusted network 110, these interactions are permitted. However, the computing systems 160 of the untrusted network 120 are unable to access the resource since at this stage the untrusted network is not connected to the temporary network. Furthermore, since the computing systems 160 of the untrusted network 120 are unable to access the temporary network since at this stage, they are also not able to access any of the computing systems 150 of the trusted network.

Figure 4C:
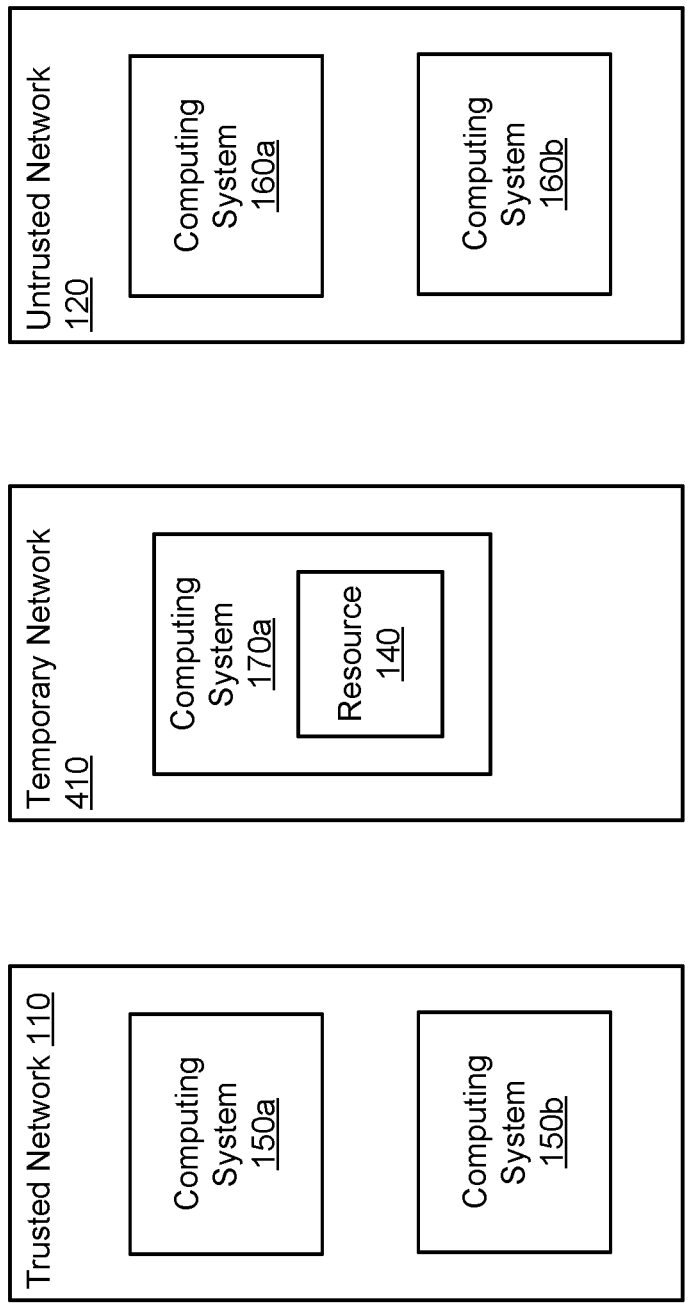
FIG. 4C illustrates network configuration in which the temporary network is disconnected from the trusted network according to an embodiment.

The resource provisioning system 200 disconnects the temporary network from the trusted network 110. Accordingly, the computing systems of the trusted network are unable to interact with the resource or any computing system of the temporary network. At this stage, even the computing systems of the untrusted network are unable to interact with the resource or any computing system of the temporary network. FIG. 4C illustrates network configuration in which the temporary network is disconnected from the trusted network 110 according to an embodiment.

Figure 4D:
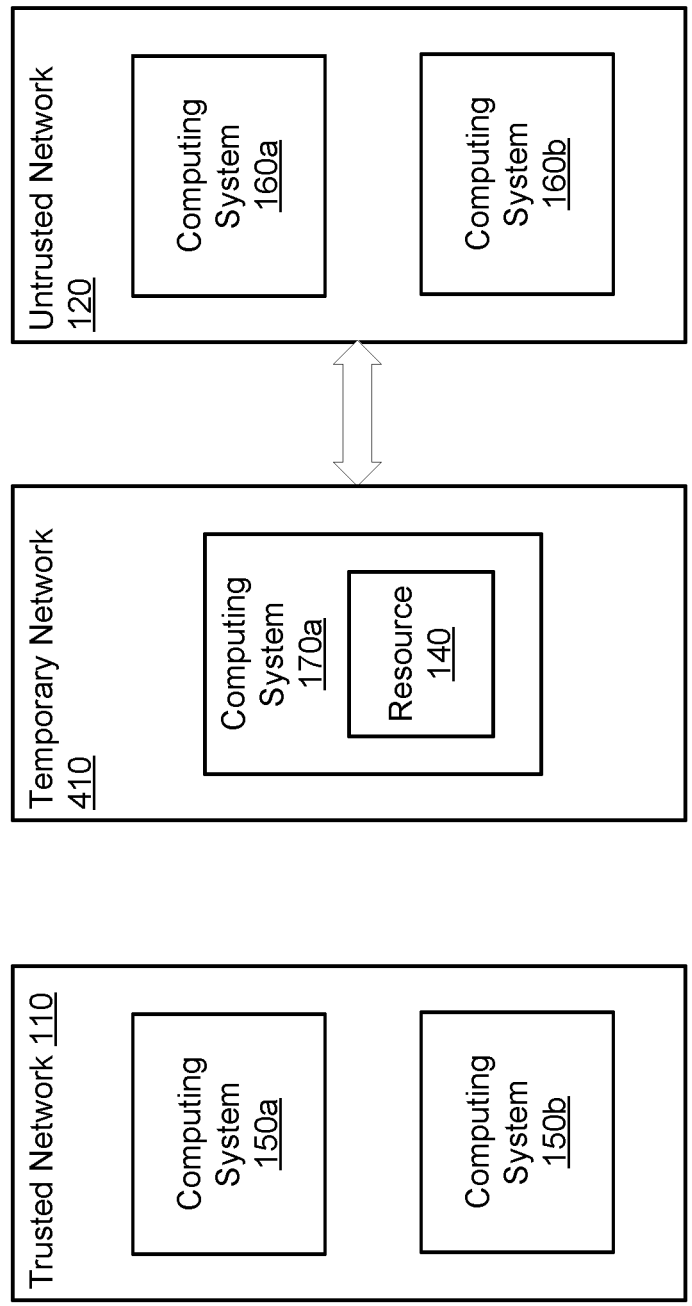
FIG. 4D illustrates a network configuration in which the temporary network is connected to the untrusted network according to an embodiment.

The resource provisioning system 200 connects the temporary network to the untrusted network 120. FIG. 4D illustrates a network configuration in which the temporary network is connected to the untrusted network 120 according to an embodiment. At this stage the computing systems 160 of the untrusted network 120 are able to interact with the computing systems 170 of the temporary network 410. However, the computing systems 170 of the temporary network 410 are unable to interact with the computing systems 150 of the trusted network 110. Accordingly, even though the computing systems 160 of the untrusted network 120 are able to interact with the computing systems 170 of the temporary network 410, they are unable to interact with the computing systems 150 of the trusted network 110.

The resource provisioning system 200 provides access to the resource 140 to the computing systems of the untrusted network 120. Accordingly, computing systems of the untrusted network 120 are now able to access the resource 140. However, the temporary network 410 is now disconnected from the trusted network 110. Therefore, even though the computing systems 160 of the untrusted network 120 are able to access the resource 140, they do not have access to the trusted network 110.

Figure 4E:
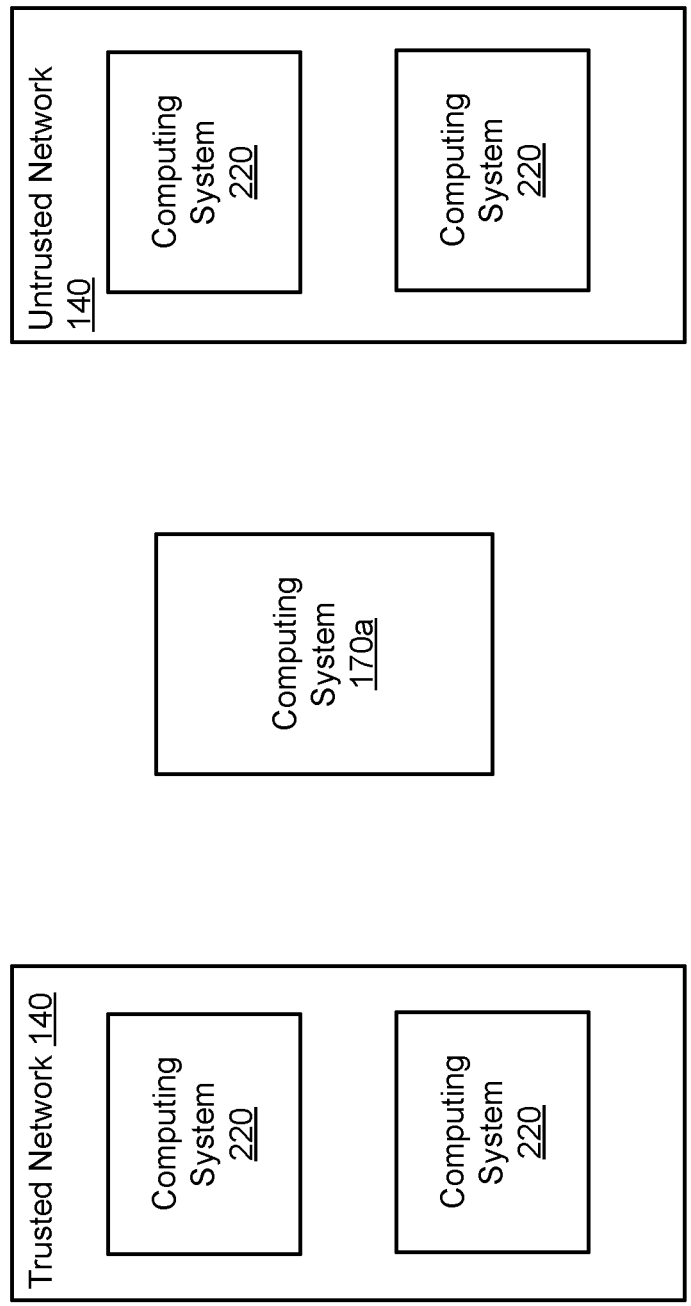
FIG. 4E shows the configuration of the network after the temporary network is destroyed according to an embodiment.

After the use of the resource by the computing system of the untrusted network, the resource provisioning system 200 may destroy 370 the temporary network 130. FIG. 4E shows the configuration of the network after the temporary network is destroyed according to an embodiment. For example, the trusted network 110 may have provisioned the resource 140 for a fixed period of time. After that period of time, the computing systems of the untrusted network are not provided with access to the resource 140. Accordingly, the temporary network 410 is removed after that period of time, thereby revoking all access to the resource 140 provided to the computing systems of the untrusted network 120. Alternatively, the resource 140 may have been made available for a specific purpose, for example, as part of a project or a campaign. Accordingly, the temporary network 410 is destroyed after the purpose of the resource 140 is served, for example, the project or the campaign is over. As another example, the availability of the resource 140 may be controlled manually, for example, by a system administrator. Accordingly, the temporary network 410 is destroyed upon request by the system administrator.

Computer Architecture

Figure 5:
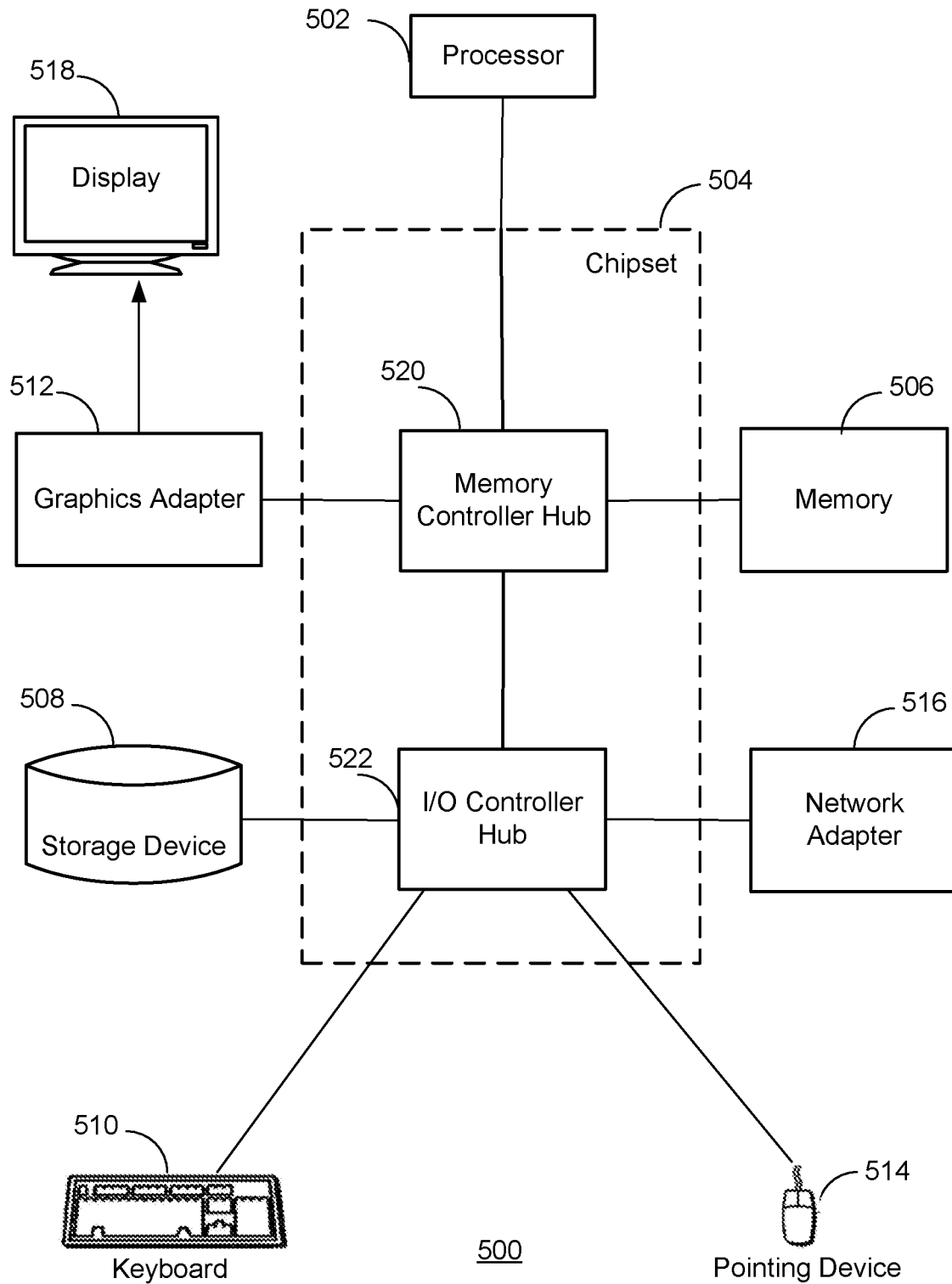
FIG. 5 is a block diagram illustrating a functional view of a typical computer system for use in the environment of FIG. 1 according to one embodiment.

FIG. 5 is a high-level block diagram illustrating a functional view of a typical computer system for use as one of the entities illustrated in the environment 100 of FIG. 1 according to an embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is a non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 200. The graphics adapter 512 displays images and other information on the display 518. The network adapter 516 couples the computer system 500 to the network.

As is known in the art, a computer 500 can have different and/or other components than those shown in FIG. 5. In addition, the computer 500 can lack certain illustrated components. For example, a computer system 500 acting as an online system may lack a keyboard 510 and a pointing device 514. Moreover, the storage device 508 can be local and/or remote from the computer 500 (such as embodied within a storage area network (SAN)).

The computer 500 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 508, loaded into the memory 506, and executed by the processor 502.

The types of computer systems 500 used by the entities of FIG. 1 can vary depending upon the embodiment and the processing power used by the entity. For example, a client device 104 may be a mobile phone with limited processing power, a small display 518, and may lack a pointing device 514. An online system, in contrast, may comprise multiple blade servers working together to provide the functionality described herein.

ADDITIONAL CONSIDERATIONS

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

I claim:

1. A computer-implemented method for securely provisioning resources of a trusted network for access by computing systems of an untrusted network, the method comprising:
   receiving a request for access to a resource of the trusted network from a computing system in the untrusted network;
   responsive to receiving the request, creating a temporary network; connecting the temporary network to the trusted network;
   provisioning the requested resource in the temporary network;
   responsive to provisioning the requested resource in the temporary network:
      disconnecting the trusted network from the temporary network, and
      responsive to disconnecting the trusted network from the temporary network, connecting the temporary network to the untrusted network; and
   providing access to the resource in the temporary network to the computing system in the untrusted network; and
   responsive to determining that access to the resource provided to the untrusted network can be removed, destroying the temporary network by reconfiguring the temporary network by disallowing the computing system in the untrusted network from connecting with the resource via the temporary network.

2. The computer-implemented method of claim 1, further comprising:
   configuring the trusted network such that computing systems of the untrusted network are prevented from communicating with computing systems of the trusted network.

3. The computer-implemented method of claim 1, further comprising:
   configuring the trusted network to prevent routability between the untrusted network and the trusted network.

4. The computer-implemented method of claim 1, further comprising:
   configuring a firewall for the trusted network, wherein the firewall prevents network traffic between the untrusted network and the trusted networks.

5. The computer-implemented method of claim 1, wherein the untrusted network includes a computing system that is likely to perform malicious attacks on resources of the trusted network.

6. The computer-implemented method of claim 1, wherein provisioning the requested resource in the temporary network using computing systems of the temporary network comprises performing network interactions between a computing system of the trusted network and a computing system of the temporary network.

7. The computer-implemented method of claim 6, wherein the network interactions between computing systems of the trusted network and computing systems of the temporary network send configuration information from the computing system of the trusted network to the computing system of the temporary network.

8. A non-transitory computer readable storage medium storing instructions that when executed by a computer processor cause the computer processor to perform steps for securely provisioning resources of a trusted network for access by computing systems of an untrusted network, the steps comprising:
   receiving a request for access to a resource of the trusted network by a computing system in the untrusted network;
   responsive to receiving the request, creating a temporary network; connecting the temporary network to the trusted network;
   provisioning the requested resource in the temporary network;
   responsive to provisioning the requested resource in the temporary network:
      disconnecting the trusted network from the temporary network, and
      responsive to disconnecting the trusted network from the temporary network, connecting the temporary network to the untrusted network; and
   providing access to the resource in the temporary network to the computing system in the untrusted network; and
   responsive to determining that access to the resource provided to the untrusted network can be removed, destroying the temporary network by reconfiguring the temporary network by disallowing the computing system in the untrusted network from connecting with the resource via the temporary network.

9. The non-transitory computer readable storage medium of claim 8, wherein the stored instructions further cause the computer processor to perform steps comprising:

configuring the trusted network such that computing systems of the untrusted network are prevented from communicating with computing systems of the trusted networks.

10. The non-transitory computer readable storage medium of claim 8, wherein the stored instructions further cause the computer processor to perform steps comprising:
configuring the trusted network to prevent routability between the untrusted network and the trusted network.

11. The non-transitory computer readable storage medium of claim 8, wherein the stored instructions further cause the computer processor to perform steps comprising:
configuring a firewall for the trusted network, wherein the firewall prevents network traffic between the untrusted network and the trusted networks.

12. The non-transitory computer readable storage medium of claim 8, wherein the untrusted network includes a computing system that has a high likelihood of performing malicious attacks on resources of the trusted network.

13. The non-transitory computer readable storage medium of claim 8, wherein instructions for provisioning the requested resource in the temporary network using computing systems of the temporary network cause the computer processor to perform network interactions between a computing system of the trusted network and a computing system of the temporary network.

14. The non-transitory computer readable storage medium of claim 13, wherein the network interactions between computing systems of the trusted network and computing systems of the temporary network send configuration information from the computing system of the trusted network to the computing system of the temporary network.

15. A computing system comprising:
a computer processor; and
a non-transitory computer readable storage medium storing instructions that when executed by a computer processor cause the computer processor to perform steps for securely provisioning resources of a trusted network for access by computing systems of an untrusted network, the steps comprising:
receiving a request for access to a resource of the trusted network from a computing system in the untrusted network;
responsive to receiving the request, creating a temporary network;
connecting the temporary network to the trusted network;
provisioning the requested resource in the temporary network;
responsive to provisioning the requested resource in the temporary network:
disconnecting the trusted network from the temporary network, and
responsive to disconnecting the trusted network from the temporary network, connecting the temporary network to the untrusted network; and
providing access to the resource in the temporary network to the computing system in the untrusted network;
responsive to determining that access to the resource provided to the untrusted network can be removed, destroying the temporary network by reconfiguring the temporary network by disallowing the computing system in the untrusted network from connecting with the resource via the temporary network.

16. The computing system of claim 15, wherein the instructions further cause the computer processor to perform steps comprising:
configuring the trusted network such that computing systems of the untrusted network are prevented from communicating with computing systems of the trusted networks, the configuring comprising setting a firewall for the trusted network, wherein the firewall prevents network traffic between the untrusted network and the trusted networks.

17. The computing system of claim 15, wherein instructions for provisioning the requested resource in the temporary network using computing systems of the temporary network cause the computer processor to perform network interactions between a computing system of the trusted network and a computing system of the temporary network.

18. The computing system of claim 15, wherein the stored instructions further cause the computing system to:
configure the trusted network to prevent routability between the untrusted network and the trusted network.

19. The computing system of claim 16, wherein the untrusted network includes a computing system that has a high likelihood of performing malicious attacks on resources of the trusted network.

20. The computing system of claim 15, wherein the untrusted network includes a computing system that is likely to perform malicious attacks on resources of the trusted network.

* * * * *